United States Patent [19]
Desiardins

[11] Patent Number: 5,874,916
[45] Date of Patent: Feb. 23, 1999

[54] FREQUENCY SELECTIVE TDOA/FDOA CROSS-CORRELATION

[75] Inventor: Gerard A. Desiardins, Endicott, N.Y.

[73] Assignee: Lockheed Martin Corporation, Bethesda, Md.

[21] Appl. No.: 591,413

[22] Filed: Jan. 25, 1996

[51] Int. Cl.[6] .................................. G01S 3/16; G01S 3/28
[52] U.S. Cl. ............................................ 342/378; 455/137
[58] Field of Search ............................... 342/378; 455/137

[56] References Cited

U.S. PATENT DOCUMENTS

| | | |
|---|---|---|
| 5,168,459 | 12/1992 | Hiller . |
| 5,285,280 | 2/1994 | Teng et al. . |
| 5,347,586 | 9/1994 | Hill et al. . |
| 5,410,621 | 4/1995 | Hyatt . |
| 5,594,452 | 1/1997 | Webber et al. ........................ 342/378 |

Primary Examiner—Theodore M. Blum
Attorney, Agent, or Firm—Lane Aitken & McCann

[57] ABSTRACT

A digital signal processing system for obtaining accurate time delay of arrival (TDOA) and frequency delay of arrival (FDOA) measuremets of a signal of interest in a dense interfering signal environment is provided. A time series of cross-spectra (called a waterfall in the art) are computed from transforms applied to overlapping data sets comprising two received digital data streams, which include the signal from an emitter of interest and one or more partially overlapping interfering signals. For each cross-spectra frequency, a transform is calculated in the time direction to create a frequency difference of arrival dimension. Regions within the transformed cross-spectrum that are associated with individual emitters are then identified based on the fact that a given emitter's transformed cross-spectrum phase changes linearly with frequency near the peak FDOA for the emitter. The frequency region(s) associated with the emitter of interest are selected based on the approximate frequency and bandwidth information provided. Applying an inverse transform for the frequencies, identified as associated with the emitter of interest, creates a time difference of arrival dimension corresponding to each frequency difference of arrival value.

15 Claims, 5 Drawing Sheets

CROSS-SPECTRUM WATERFALL

FDOA/FREQUENCY SURFACE WITH SELECTED FREQUENCY REGIONS

TDOA/FDOA SURFACE CONSTRUCTED FROM SELECTED FREQUENCIES

FDOA/FREQUENCY SURFACE MAGNITUDE AND PHASE AT FDOA PEAK FOR FREQUENCY REGION OF INTEREST

FREQUENCY SELECTIVE TDOA/FDOA CROSS-CORRELATION

This invention was made with Government support under a contract awarded by the Government. The Government has certain rights in this invention.

BACKGROUND OF THE INVENTION

1. Field of the Invention

This invention relates to an improved signal processing system for determining the relative time delay and frequency shift of a signal from an emitter of interest received at two spaced apart locations, and more particularly to a digital signal processing system to identify components of the signal of interest quickly and accurately in the presence of noise and partially overlapping interfering signals.

Signals received by two or more spaced apart receivers (e.g. antennas for electromagnetic signals and microphones for acoustic signals) are commonly used in the art in order to determine the location of the signal emitter. Accurately determining the relative time delay and frequency shift between two received signals is a key step in obtaining accurate emitter position estimates.

Cross-correlation of the signal received at two locations is a well known and commonly used signal processing technique for measuring the relative time delay and frequency shift of a signal. The relative time delay is referred to herein as the time difference of arrival (TDOA) and the frequency shift is referred to as the frequency difference of arrival (FDOA), also known in the art as Differential Doppler. The presence of one or more interfering signals received along with the signal of interest may distort the cross-correlation result degrading the accuracy of the TDOA and FDOA measurements for the signal of interest.

There are several different ways in which another signal can interfere with the signal of interest. These include, signals nominally in adjacent channels in the spectrum with parts overlapping the signal of interest or narrow bandwidth interference superimposed on the signal of interest. The interfering signal can also completely overlay the signal of interest, but this complete overlap case is not the subject of this invention.

2. Description of the Prior Art

In general, the prior art recognizes that digital signal processing systems can realize improved performance in terms of processing time and in terms of accuracy in TDOA and FDOA measurements by eliminating any interfering signals prior to the correlation process step. But, in the prior art, specific information about the signal of interest, including its spectral shape and modulation, is typically used to distinguish it from interfering signals. In an environment dense with interfering signals with many different signal modulations, this and other prior art techniques to separate the signal of interest from interfering signals are complex and not reliable.

SUMMARY OF THE INVENTION

An object of this invention is the provision of a robust, reliable digital signal processing system for identifying a signal of interest in an environment of dense interfering signals which only partially overlap the signal of interest.

Another object of this invention is the provision of a signal processing system for identifying a signal of interest which requires a priori knowledge only of the approximate frequency and bandwidth of the signal of interest and does not require detailed knowledge of the signal of interest or detailed knowledge of the interfering signals.

The third object of this invention is the provision of a signal processing system for providing a means of obtaining accurate TDOA and FDOA measurements of a signal of interest in a dense interfering signal environment.

Briefly, this invention contemplates the provision of a digital signal processing system in which a time series of cross-spectra (called a waterfall in the art) are computed from transforms applied to overlapping data sets comprising the two received digital data streams, which include the signal from the emitter of interest and one or more partially overlapping interfering signals. For each cross-spectra frequency, a transform is calculated in the time direction to create a frequency difference of arrival dimension. Regions within the transformed cross-spectrum that are associated with individual emitters are then identified based on the fact that a given emitter's transformed cross-spectrum phase changes linearly with frequency near the peak FDOA for the emitter. A random phase change identifies regions where noise or interference is corrupting the phase measurements, and jumps in linear phase identify transitions between emitters. The frequency region(s) associated with the emitter of interest are selected based on the approximate frequency and bandwidth information provided. Applying an inverse transform for the frequencies, identified as associated with the emitter of interest, creates a time difference of arrival dimension corresponding to each frequency difference of arrival value.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
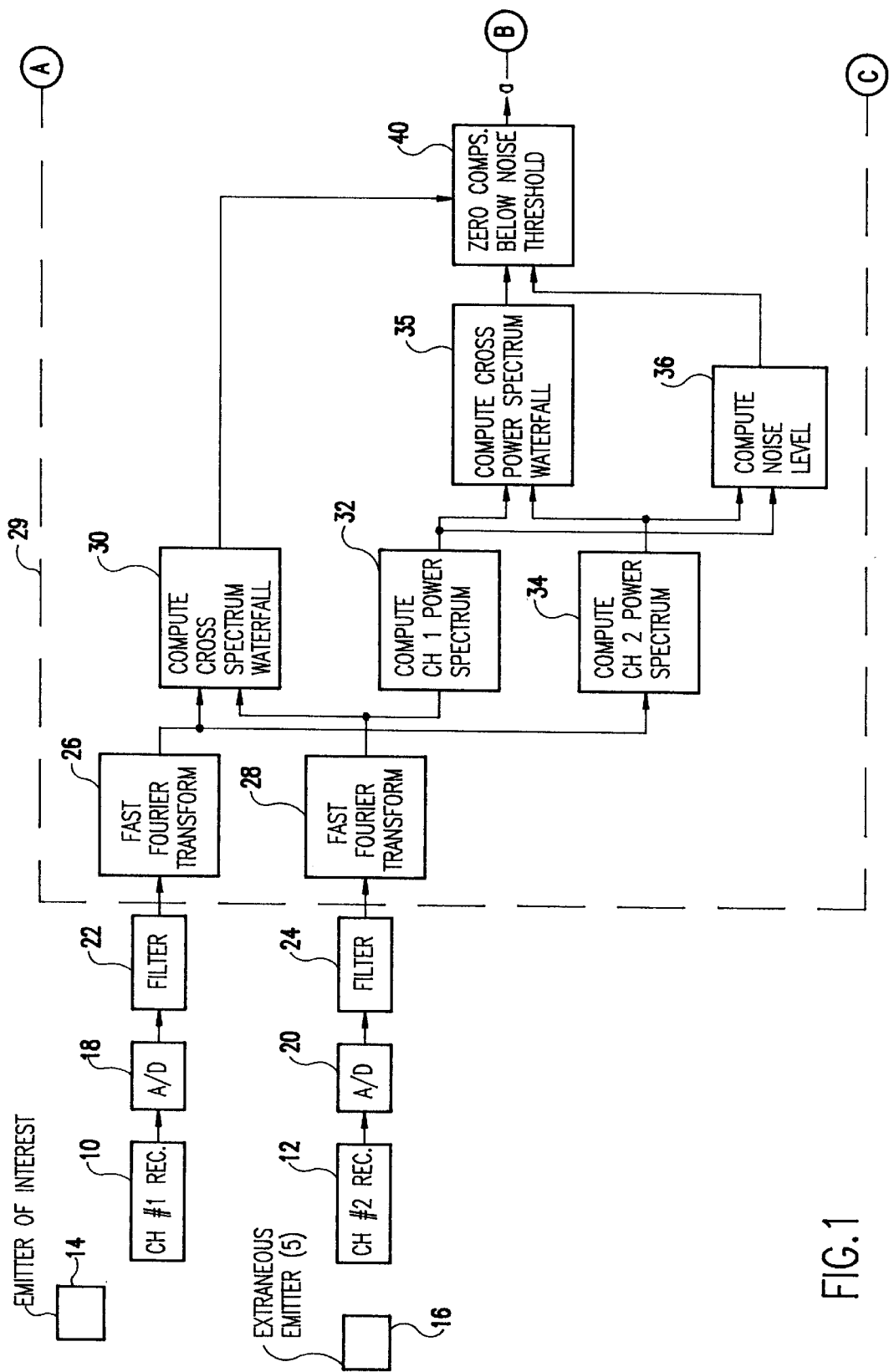
FIGS. 1 and 1A is a functional block diagram of a TDOA/FDOA digital signal processing system in accordance with the teachings of this invention.
Figure 1A:
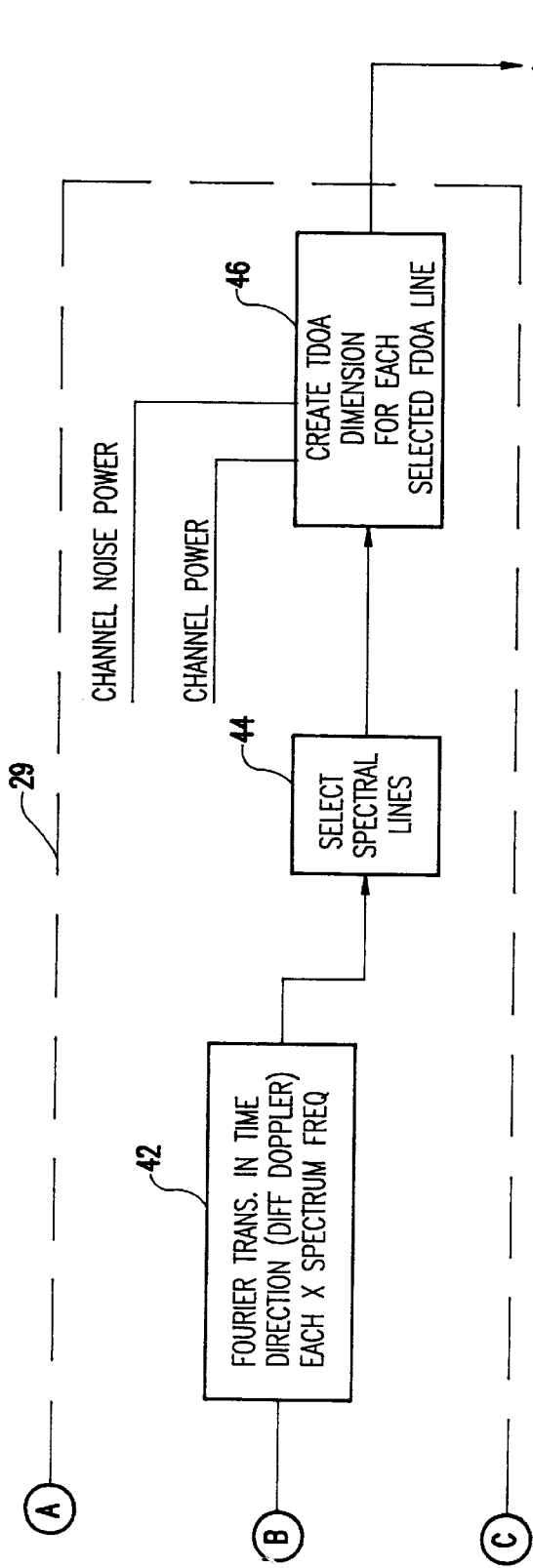

Referring now to FIGS. 1 and 1A, the signal processing system of this invention cross-correlates the signals received by channel #1 signal receiver 10 with the signals received by channel #2 signal receiver 12 from the emitter of interest 14 in the presence of extraneous signals from one or more emitters 16. The signal processing system processes these signals to identify the uncontaminated parts of the signal of interest and uses only those uncontaminated parts to build the TDOA/FDOA cross-correlation surface. The system requires an a priori knowledge only of the approximate frequency and bandwidth of the signal from the emitter of interest. In a preferred embodiment of the invention at least one receiver has two channels. The data received from the two channels at one receiver is used to provide direction of arrival information to aid in performing a select spectral lines operation, as hereinafter described, by associating those values whose energy comes from the same direction with the same emitter.

Analogue to digital converters 18 and 20, respectively, convert the received channel #1 and channel #2 inputs to a digital signal using the same sampling rate for each channel. Digital filters 22 and 24 prepare the digital data streams on channels 1 and 2 for the correlation process. These filters may include, for example, complex envelope filters, frequency shifting to center the processing passband, multiple stages of lowpass filtering with decimation to match the processing bandwidth to expected signal bandwidth, and, if necessary, a calibration filter to adjust for transfer function differences between receive channels. See the book *Digital Signal Processing* by A. Oppenheim and R. Schafer for a description of digital filtering and the techniques for computing digital filter coefficients.

A correlation process 29 indicated by the dotted box builds the correlation surface from the two signal data streams provided by filters 22 and 24 using a modified frequency domain cross-correlation process. The total collection interval is determined by the signal characteristics, the noise level, the maximum Doppler shift expected, and the desired TDOA and FDOA accuracy. In this process, the collection interval is subdivided into multiple signal data sets. The frequency spectrum of the signal in each channel and the frequency cross-spectrum between the channel signals is computed for each data set creating waterfalls of spectra. From the channel spectral data, the noise level for each channel data stream is estimated and is used to determine a gating threshold. All cross-spectra waterfall elements that fall below the gating threshold are zeroed. The remaining cross-spectral elements are combined in the frequency (FDOA) dimension. The frequency elements associated with the emitter of interest are selected for use in computing the delay (TDOA) dimension. An inverse Fourier Transform is applied to the selected frequencies to create the delay dimension of the correlation surface.

Multiple cross-correlation surfaces can be constructed using this approach. These surfaces can be combined using prior art techniques to generate a surface which will provide more accurate TDOA and FDOA measurements. However, noise level estimation need be performed only for the first pass through the TDOA/FDOA surface generation process as noise statistics for subsequent passes should be similar to those observed in the initial pass.

Specifically, the initial step of the process is to compute for the signals received by channels #1 and #2 multiple cross-spectra of the two signals and their respective signal power estimates. Processor routines indicated by blocks 26 and 28 calculate a weighted Fourier Transform that may be implemented as a Fast Fourier Transform (FFT), if desired, for the filtered, digital data streams of channels #1 and #2, respectively. The input data set sizes are slightly larger for one channel (e.g. the "shifted" channel) than for the other channel. The "shifted" channel is the channel that gets shifted relative to the other channel in TDOA computation. In the equation for X(n) shown below, channel #2 is the shifted channel and channel #1 the unshifted channel $$X(n) = \sum_{i=0}^{I-1} s_1(i) \overline{s_2}(i-n)$$

where
- $X(n)$ is the correlation function,
- n is the shift index
- $s_1(i)$ is sample data stream from channel #1
- $\overline{s_2}(i-n)$ is the shifted complex conjugate of the sample data stream from channel #2
- I is the number of samples being correlated.

The shifted channel #2 input to the Fourier Transform is larger than the unshifted channel #1 input by an amount at least sufficient to cover the desired range of TDOA. The maximum length of the channel #2 input data set is established by the maximum FDOA expected. The phase change due to FDOA should not exceed 45°. Limiting the phase change to a smaller value will improve FDOA accuracy.

The phase step of the Fourier Transform 26 or 28 or alternatively, the length of the FFT (defined as N_FFT) is selected to provide the desired spectrum frequency resolution. A weight vector is applied to the input data sets for both channels. The purpose of the weight vector is to control the Fourier Transform or FFT sidelobe levels. There are many suitable weightings described in the prior art such as in the paper "On the Use of Windows for Harmonic Analysis with the Discrete Fourier Transform" by Frederic I. Harris, Proceedings of the IEEE, Vol. 66, No.1, Jan. 1978, which may be used.

Figure 2A:
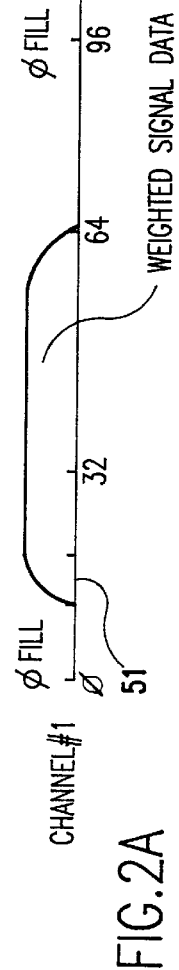
FIGS. 2A and 2B show two graphs of input vectors depicting the placement of signal data for channel #1 and #2, respectively, for an FFT implementation of the Fourier Transforms used to compute the cross-spectrum in the preferred embodiment of this invention.
Figure 2B:
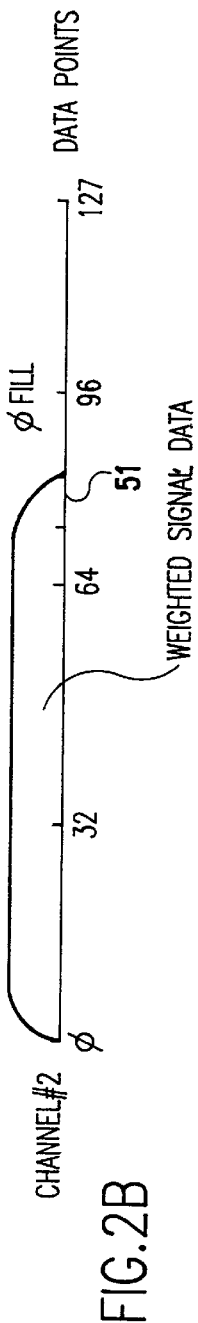

FIGS. 2A and 2B illustrate an example of signal data placement with an N_FFT equal to 128. Each data point can contain a complex number. The input vectors are provided to the FFTs for calculation. Input vector positions which do not have signal data are filled with zeroes.

A possible set of parameters for an FFT implementation of the Fourier Transform in blocks 26 and 28 is shown below.

Channel #1 (unshifted) length = 50 samples
Channel #2 (shifted) length = 80 samples
N_FFT = 128
Step size between spectra = 44
The following weighting is applied to each channel $$W(n) = \sin^2\left(4\pi \frac{n}{\text{Length}}\right)$$

where n=0 to EdgeCount−1
Also W(Length−1−n)=W(n) for n−0 to EdgeCount−1, W(n) =1 for EdgeCount≦n≦Length−1−EdgeCount, and $$\text{EdgeCount} = \text{Floor}\left(\frac{\text{Length}}{8}\right)$$

EdgeCount is the area indicated in FIG. 2B by numeral 51.
n is the sample index.
Length is the length of the channel data set size (50 for channel #1 and 80 for channel #2).
Floor is a truncation function which truncates the decimal portion and leaves the integer value.

A program routine 30 calculates a cross-spectrum in the frequency domain of the two channels by multiplying the Fourier Transform output of one channel times the complex conjugate of the Fourier Transform output of the other channel.

Processor routines indicated at 32 and 34 compute the signal power for each spectral frequency represented in the Fourier Transform outputs for channels #1 and #2, respectively, and a processor routine 35 computes a power cross-spectrum by multiplying the spectral signal power for channel #1 times the spectral signal power for channel #2. The signal and cross spectra only have to be computed over the range of frequencies where the signal is expected.

Figure 3A:
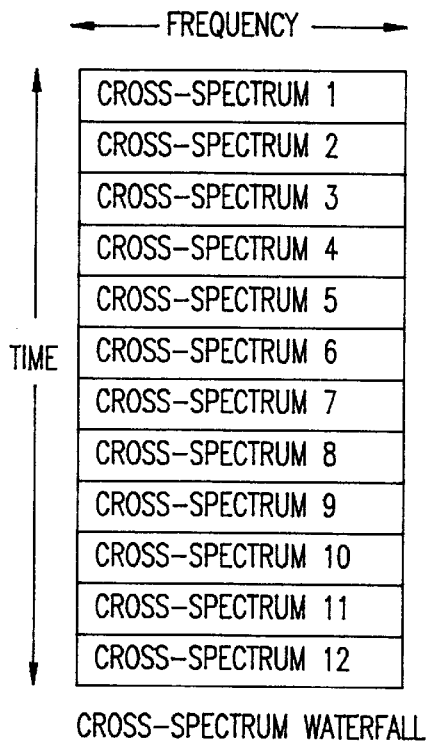
FIGS. 3A, 3B, and 3C illustrate the evolution of the time series of cross-spectra (waterfall) in FIG. 3A, the FDOA/Frequency surface with selected frequency regions in FIG. 3B, and a TDOA/FDOA surface in FIG. 3C as described in this invention.

Signal and power spectra for both channels as well as the channel cross-spectra are computed a multiple number of times by advancing, in steps (time), through the input data streams until the entire collection interval has been processed. The step between successive data sets is less than the length of the data sets so that the data sets overlap from one Fourier Transform to the next. The step size is selected so that unambiguous FDOA measurements are obtained over the expected range of FDOA. FIG. 3A shows how the cross-spectrum waterfall is constructed.

A routine 36 computes the estimated noise level for channel #1 and channel #2. There are many techniques described in the prior art for estimating noise level. One approach uses a histogram and is based on the expectation that not all frequencies will contain signal power all of the time. The noise level is computed as a specified percentile of the histogram or as the median or average of the m percent lowest values scaled by a constant related to the m selected. The noise estimation approach and parameters selected depend on the statistical behavior of the noise and signal environment. The noise level for the cross-spectra is obtained by multiplying the channel #1 noise level by the channel #2 noise level. The cross-spectra noise level is multiplied by a constant to establish a gate threshold and this threshold value is applied to the power cross-spectra at 40 to zero those components that fall below the threshold and thus contain mostly noise. For all the power cross-spectrum components that fall below the threshold, the corresponding cross-spectra components are also zeroed.

Figure 3B:
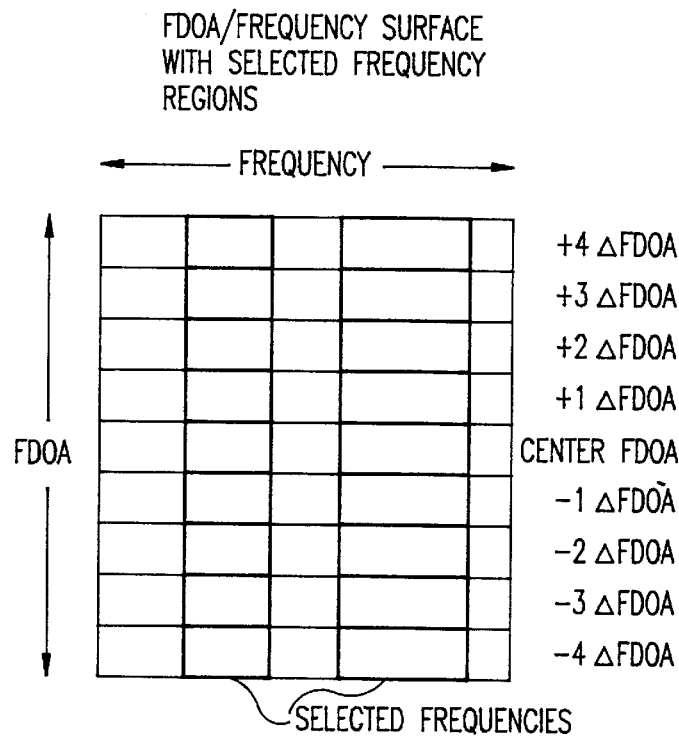

In order to create the FDOA dimension of the correlation surface, a routine 42 sums the cross-spectra in the differential Doppler (FDOA) direction for each cross-spectra frequency by applying a Fourier Transform to all the gated cross spectra outputs for that frequency. The Fourier Transform phase increment is based on the desired sampling rate for the correlation surface peak in the FDOA direction. In the preferred embodiment, $$x_{dd}(k, q) = \sum_{l=1}^{Number\_of\_Spectra} CS(k, l) e^{-jl(q-q_c)Phase\_Increment}$$

$$Phase\_Increment = \frac{2\pi}{2.56 \, Number\_of\_Spectra}$$

where $x_{dd}(k,q)$ is the FDOA/frequency surface k is the frequency index, q is the FDOA index, and CS represents the gated cross-spectra. The number of outputs and the center frequency ($q_c$) depend on the size of the phase increment and the range of Doppler frequencies expected. FIG. 3B illustrates how the FDOA/frequency surface is constructed from the Fourier Transform of the cross-spectrum waterfall.

Figure 4A:
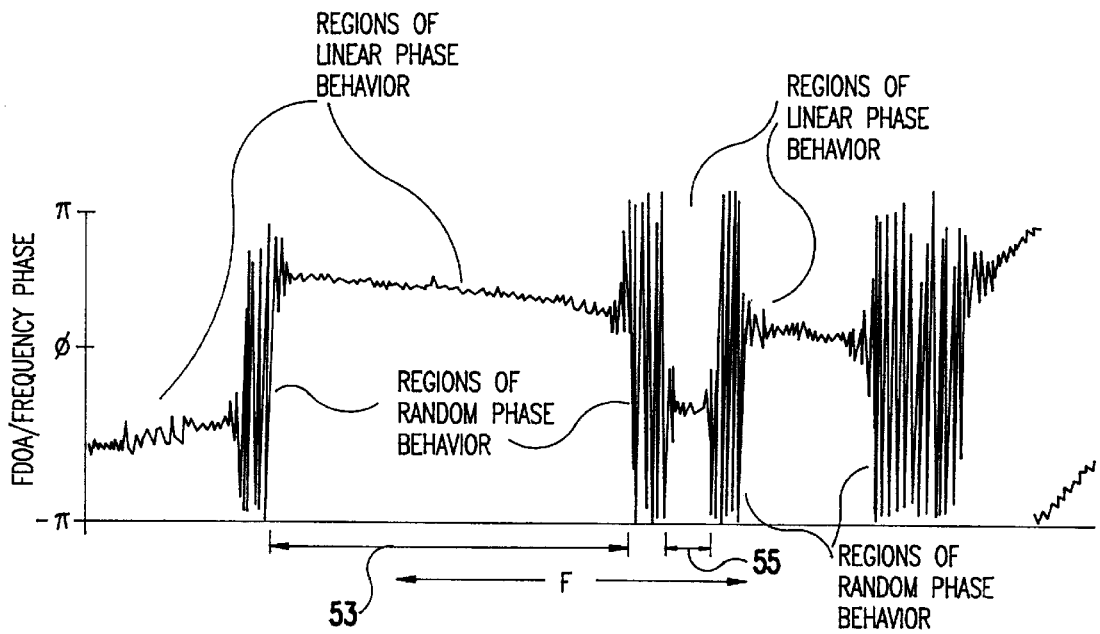
FIGS. 4A and 4B are graphs having a common frequency scale of FDOA/frequency versus surface magnitude, and phase, respectively, for an FDOA peak for a frequency region of interest in accordance with one aspect of the present invention.
Figure 4B:
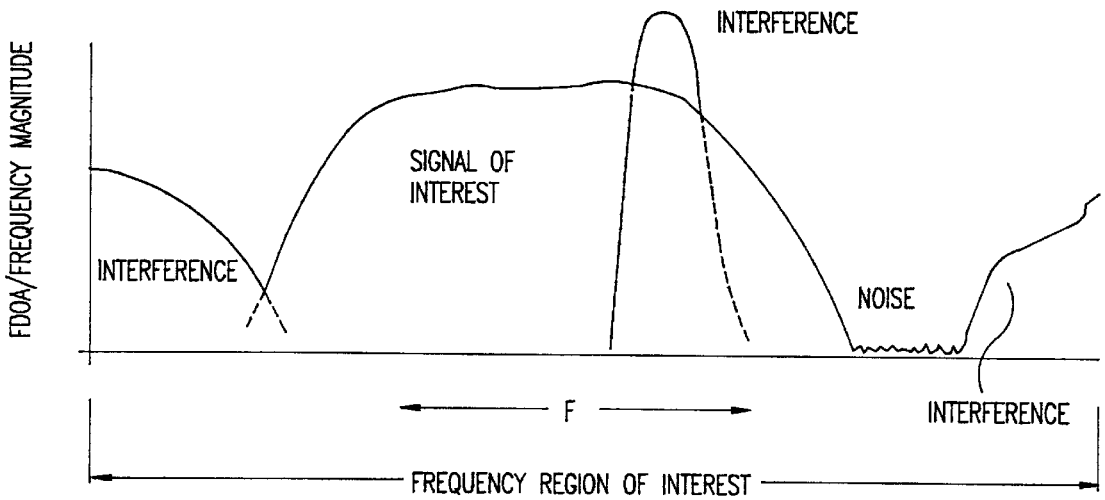

A process routine 44 identifies these regions in the FDOA/frequency output of routine 42 associated with the emitter of interest. Several approaches for associating spectral lines with specific emitters are possible. In the preferred embodiment, the identification process is based on the fact that for a given emitter, the FDOA/frequency surface phase near the FDOA peak for an emitter changes linearly with frequency. Referring now to FIGS. 4A and 4B, an FDOA/frequency surface magnitude and phase are shown on a common frequency scale for a frequency region of interest. Noisy phase identifies regions where noise or interference is corrupting the phase measurements. Jumps in phase identify transitions between emitters. Jumps can be identified by comparing the phase behavior on either side of a region of random phase behavior. A jump in the phase indicates a change in emitter, such as occurs between the regions indicated by reference numerals 53 and 55 in FIG. 4A. Regions in the FDOA/Frequency surface where FDOA peaks and linear phase change occur are identified in FIG. 4A. Regions separated in frequency whose phase fit the same straight line are associated with the same emitter. The FDOA/frequency region(s) associated with the emitter of interest are selected from all the regions identified by applying some general information about the signal (approximate frequency and bandwidth) from the emitter of interest. Alternatively, the decision process can be delayed until after the creation of the TDOA/FDOA surface and the spectral regions associated with all emitters present are identified.

If two channels are available at at least one of the collection sites, such as a channel #1A and #1B, another approach for associating spectral lines with emitters becomes possible. With two collection channels at at least one of the receive sites, the direction of arrival of the signal energy contributing to each spectral line can be estimated. Spectral lines whose energy comes from the same direction would be associated with the same emitter.

Figure 3C:
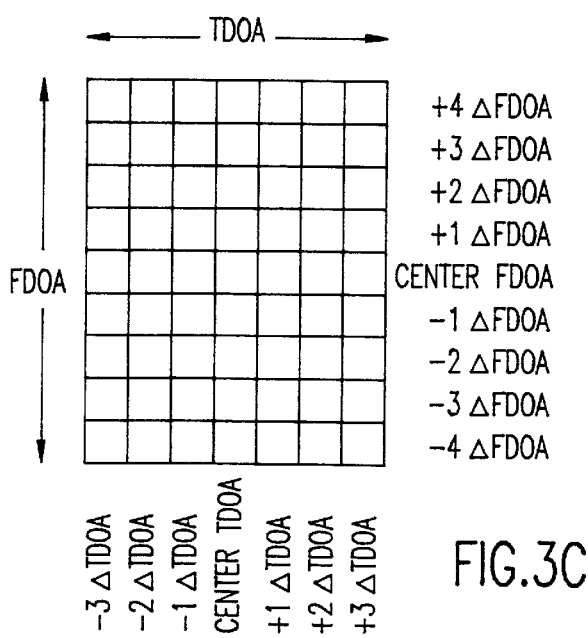

Finally, a routine 46 sums the FDOA Fourier Transform outputs of routine 42 in the frequency direction over the frequency range(s) selected by select spectral lines routine 44. Routine 46 entails performing an inverse Fourier Transform to create the TDOA dimension for each desired value of FDOA. In a preferred embodiment of the invention, a 2 times N_FFT long Fourier Transform is used in order to provide sufficient resolution in the TDOA dimension. Only those FFT outputs corresponding to the desired range of TDOA are kept. FIG. 3C shows how the TDOA/FDOA surface over the desired range of values would be layed out.

As will be appreciated by those skilled in the art, any suitable processor routine may be used to carry out the individual processor steps described in connection with the invention. While Fourier transforms were used in the embodiment described to create the cross spectrums as a function of time from the sample data and to create the FDOA frequency surface from the cross spectrum waterfall and to create the TDOA/FDOA surface from the FDOA/frequency surface other transforms capable of transforming from the time to frequency domain and back could alternatively be used.

Figure 5:
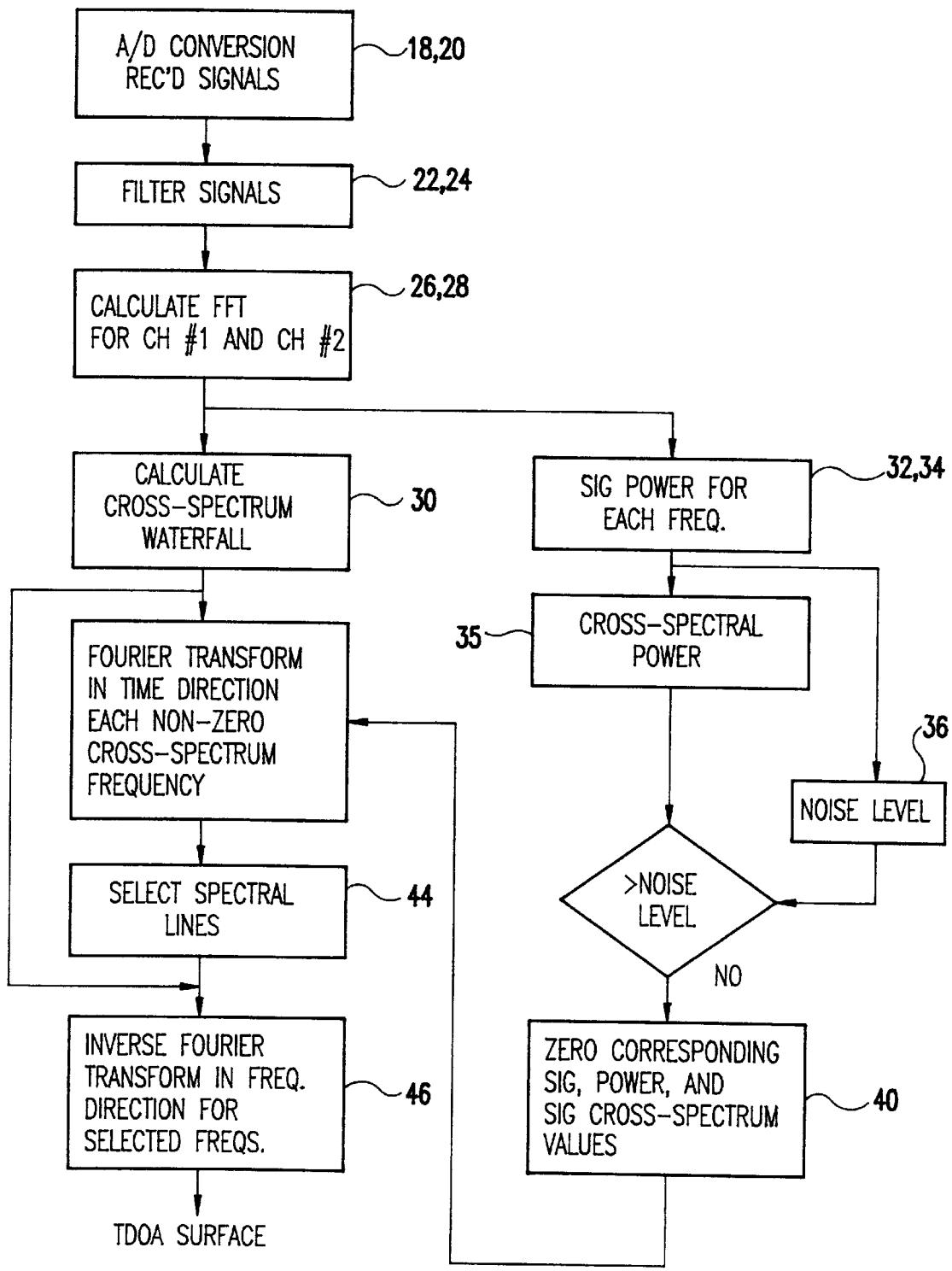
FIG. 5 is a flow diagram of the process described in connection with FIGS. 1–4.

FIG. 5 is a flow diagram of the operation of the system described in connection with FIGS. 1–4. The reference numbers used in FIG. 5 are consistent with the operations described in FIGS. 1–4 so that FIG. 5 is self-explanatory.

While the invention has been particularly shown and described with reference to preferred embodiments thereof, it will be understood by the those skilled in the art that various changes in form and details may be made therein without departing from the spirit and scope of the invention.

Having thus described my invention, what I claim as new and desire to secure by Letters Patent is as follows:

1. A digital signal processing system for processing a signal received at two spaced apart receivers from an emitter of interest in order to derive frequency difference of arrival data and time difference of arrival data for the signal at the two spaced apart receivers, comprising in combination:

means to convert the signal received by one spaced apart receiver to a first digital data stream that digitally represents the signal as a series of values as a function of time;

means to convert the signal received by the other spaced apart receiver to a second digital data stream that digitally represents the signal as a series of values as a function of time;

means to convert said first digital data stream to a first spectrum of values that represents the signal as a series of values as a function of frequency;

means to convert said second digital data stream to a second spectrum that represents the signal as a series of values as a function of frequency;

means to cross-multiply said first spectrum and said second spectrum to generate a plurality of cross-spectra as a function of time;

means to transform each frequency in said plurality of cross-spectra to a series of frequency difference of arrival values which represent each said frequency in said plurality of cross-spectra;

means to select in said series of values which represent each said frequency those values that represent said emitter of interest; and means to sum said frequency values that represent said emitter of interest to create a time difference of arrival value for said values that represent said emitter of interest.

2. A digital signal processing system for processing a signal received at two spaced apart receivers from an emitter of interest in order to derive frequency difference of arrival data and time difference of arrival data for the signal at the two spaced apart receivers, comprising in combination:

means to convert the signal received by one spaced apart receiver to a first digital data stream that digitally represents the signal as a series of values as a function of time;

means to convert the signal received by the other spaced apart receiver to a second digital data stream that digitally represents the signal as a series of values as a function of time;

means to convert said first digital data stream to a first spectrum of values that represents the signal as a series of values as a function of frequency;

means to convert said second digital data stream to a second spectrum that represents the signal as a series of values as a function of frequency;

means to cross-multiply said first spectrum and said second spectrum to generate a plurality of cross-spectra as a function of time;

means to transform each frequency in said plurality of cross-spectra to a series of frequency difference of arrival values which represent each said frequency in said plurality of cross-spectra as a function of time;

means to select using the phase behavior with frequency near the peak frequency difference of arrival value said series of values which represent each said frequency whose phase changes lineally with frequency that represent said emitter of interest; and means to sum said frequency values that represent said emitter of interest to create a time difference of arrival value for said values that represent said emitter of interest.

3. A digital signal processing system for processing a signal received at two spaced apart receivers from an emitter of interest as in claim 1 wherein at least one of said two spaced apart receivers has two channels which provide direction of arrival information and wherein said means to select in said series of values which represent each said frequency includes means for using the direction of arrival to select those values that represent the emitter of interest.

4. A digital signal processing system for processing a signal received at two spaced apart receivers from an emitter of interest as in claim 1 wherein said means to convert said first digital data stream to a first spectrum of values that represents the signal as a series of values as a function of frequency includes means to Fourier transform said first digital data stream, and said means to convert said second digital data stream to a second spectrum that represents the signal as a series of values as a function of frequency includes means to Fourier transform said second digital data stream.

5. A digital signal processing system for processing a signal received at two spaced apart receivers from an emitter of interest as in claim 1 wherein said means to convert the signal received by one spaced apart receiver to a first digital data stream that digitally represents the signal as a series of values as a function of time includes means to Fourier transform said first digital data stream, and said means to convert the signal received by the other spaced apart receiver to a second digital data stream that digitally represents the signal as a series of values as a function of time includes means to Fourier transform said second digital data stream.

6. A digital signal processing system for processing a signal received at two spaced apart receivers from an emitter of interest as in claim 1, wherein said means to transform each frequency in said plurality of cross-spectra to a series of frequency difference of arrival values which represent each said frequency in said plurality of cross-spectra as a function of time includes means to Fourier transform said each frequency.

7. A digital signal processing system for processing a signal received at two spaced apart receivers from an emitter of interest as in claim 1, wherein said means to sum said frequency values that represent said emitter of interest to create a time difference of arrival value includes means to Fourier transform said each frequency difference of arrival value.

8. A digital signal processing system for processing a signal received at two spaced apart receivers from an emitter of interest as in claim 2 wherein said means to convert said first digital data stream to a first spectrum of values that represents the signal as a series of values as a function of frequency includes means to Fourier transform said first digital data stream, and said means to convert said second digital data stream to a second spectrum that represents the signal as a series of values as a function of frequency includes means to Fourier transform said second digital data stream.

9. A digital signal processing system for processing a signal received at two spaced apart receivers from an emitter of interest as in claim 2, wherein said means to transform each frequency in said plurality of cross-spectra to a series of frequency difference of arrival values which represent said each frequency in said plurality of cross-spectra as a function of time includes means to Fourier transform said each frequency.

10. A digital signal processing system for processing a signal received at two spaced apart receivers from an emitter of interest as in claim 2, wherein said means to sum said frequency values that represent said emitter of interest to create a time difference of arrival value includes means to Fourier transform said frequency values for said each frequency difference of arrival value.

11. A digital signal processing system for processing a signal received at two spaced apart receivers from an emitter of interest as in claim 2 wherein said means to convert the signal received by one spaced apart receiver to a first digital data stream that digitally represents the signal as a series of values as a function of time includes means to Fourier transform said first digital data stream, and said means to convert the signal received by the other spaced apart receiver to a second digital data stream that digitally represents the signal as a series of values as a function of time includes means to Fourier transform said second digital data stream.

12. A digital signal processing method for processing a signal received at two spaced apart receivers from an emitter of interest in order to derive frequency difference of arrival data and time difference of arrival data for the signal at the two spaced apart receivers, comprising in combination:

converting the signal received by one spaced apart receiver to a first digital data stream that digitally represents the signal as a series of values as a function of time;
   converting the signal received by the other spaced apart receiver to a second digital data stream that digitally represents the signal as a series of values as a function of time;
   converting said first digital data stream to a first spectrum of values that represents the signal as a series of values as a function of frequency;
   converting said second digital data stream to a second spectrum that represents the signal as a series of values as a function of frequency;
   cross-multiplying said first spectrum and said second spectrum to generate a plurality of cross-spectra as a function of time;
   transforming each frequency in said plurality of cross-spectra to a series of frequency difference of arrival values which represent said each frequency in said plurality of cross-spectra;
   selecting in said series of values which represent each said frequency those values that represent said emitter of interest; and
   summing said values that represent said emitter of interest to create a time difference of arrival value for said values that represent said emitter of interest.

13. A digital signal processing method for processing a signal received at two spaced apart receivers from an emitter of interest in order to derive frequency difference of arrival data and time difference of arrival data for the signal at the two spaced apart receivers, comprising in combination:

converting the signal received by one spaced apart receiver to a first digital data stream that digitally represents the signal as a series of values as a function of time;
   converting the signal received by the other spaced apart receiver to a second digital data stream that digitally represents the signal as a series of values as a function of time;
   converting said first digital data stream to a first spectrum of values that represents the signal as a series of values as a function of frequency;
   converting said second digital data stream to a second spectrum that represents the signal as a series of values as a function of frequency;
   cross-multiplying said first spectrum and said second spectrum to generate a plurality of cross-spectra as a function of time;
   transforming each frequency in said plurality of cross-spectra to a series of frequency difference of arrival values which represent said each frequency in said plurality of cross-spectra;
   selecting using the phase behavior with frequency near the peak frequency difference of arrival value in said series of values which represent each said frequency those values that represent said emitter of interest; and
   summing said values that represent said emitter of interest to create a time difference of arrival value for said values that represent said emitter of interest.

14. A digital signal processing method for processing a signal received at two spaced apart receivers from an emitter of interest in order to derive frequency difference of arrival data and time difference of arrival data for the signal at the two spaced apart receivers, including the steps of:

converting the signal received by one spaced apart receiver to a first digital data stream that digitally represents the signal as a series of values as a function of time;
   converting the signal received by the other spaced apart receiver to a second digital data stream that digitally represents the signal as a series of values as a function of time;
   converting said first digital data stream to a first spectrum of values that represents the signal as a series of values as a function of frequency;
   converting said second digital data stream to a second spectrum that represents the signal as a series of values as a function of frequency, then;
   cross-correlating said first spectrum and said second spectrum to generate a plurality of cross-spectra, then;
   transforming each frequency in said plurality of cross-spectra to a series of frequency difference of arrival values which represent said each frequency in said plurality of cross-spectra as a function of time, then;
   selecting in said series of values which represent each said frequency those values that represent said emitter of interest; and then,
   summing said values that represent said emitter of interest to create a time difference of arrival value for said values that represent said emitter of interest.

15. A digital signal processing method for processing a signal received at two spaced apart receivers from an emitter of interest in order to derive frequency difference of arrival data and time difference of arrival data for the signal at the two spaced apart receivers, including the steps of:

converting the signal received by one spaced apart receiver to a first digital data stream that digitally represents the signal as a series of values as a function of time;
   converting the signal received by the other spaced apart receiver to a second digital data stream that digitally represents the signal as a series of values as a function of time;
   converting said first digital data stream to a first spectrum of values that represents the signal as a series of values as a function of frequency;

converting said second digital data stream to a second spectrum that represents the signal as a series of values as a function of frequency, then;

cross-correlating said first spectrum and said second spectrum to generate a plurality of cross-spectra, then;

transforming each frequency in said plurality of cross-spectra to a series of frequency difference of arrival values which represent said each frequency in said plurality of cross-spectra as a function of time, then;

selecting in said series of values which represent each said frequency whose phase values near a peak value change linearly with frequency and thus represent said emitter of interest; and then summing said values that represent said emitter of interest to create a time difference of arrival value for said values that represent said emitter of interest.

* * * * *

UNITED STATES PATENT AND TRADEMARK OFFICE
CERTIFICATE OF CORRECTION

PATENT NO. : 5,874,916
DATED : February 23, 1999
INVENTOR(S) : Gerard A. Desjardins It is certified that error appears in the above-identified patent and that said Letters Patent is hereby corrected as shown below:

Title page, item [75], inventor: should read --Gerard A. Desjardins --.

Signed and Sealed this

Thirtieth Day of November, 1999

Attest:

Q. TODD DICKINSON

Attesting Officer

Acting Commissioner of Patents and Trademarks